(12) United States Patent
Sekol

(10) Patent No.: US 8,599,002 B2
(45) Date of Patent: Dec. 3, 2013

(54) REAR MOUNTED SPEEDOMETER WITH PANIC DECELERATION AND STOPPED VEHICLE WARNING DEVICE

(76) Inventor: Edward Sekol, Traverse City, MI (US)

(*) Notice: Subject to any disclaimer, the term of this patent is extended or adjusted under 35 U.S.C. 154(b) by 635 days.

(21) Appl. No.: 12/586,005

(22) Filed: Sep. 16, 2009

(65) Prior Publication Data

US 2010/0066514 A1    Mar. 18, 2010

Related U.S. Application Data

(60) Provisional application No. 61/192,407, filed on Sep. 18, 2008.

(51) Int. Cl.
*B60Q 1/00* (2006.01)
(52) U.S. Cl.
USPC ........... 340/431; 340/435; 340/464; 340/467; 340/469; 340/479; 340/903; 340/932.2
(58) Field of Classification Search
USPC ................. 340/341, 435, 466, 467, 469, 903, 340/932.2, 464, 479
See application file for complete search history.

(56) References Cited

U.S. PATENT DOCUMENTS

| | | | | |
|---|---|---|---|---|
| 4,556,862 A | * | 12/1985 | Meinershagen | 340/478 |
| 5,838,259 A | * | 11/1998 | Tonkin | 340/903 |
| 7,155,329 B2 | * | 12/2006 | Mepham et al. | 701/70 |
| 7,375,627 B2 | * | 5/2008 | Johnson et al. | 340/468 |
| 7,893,823 B2 | * | 2/2011 | Morales | 340/479 |
| 2002/0133282 A1 | * | 9/2002 | Ryan et al. | 701/70 |
| 2006/0273891 A1 | * | 12/2006 | Quach et al. | 340/467 |
| 2008/0309478 A1 | * | 12/2008 | Morales | 340/467 |

* cited by examiner

*Primary Examiner* — Tai T Nguyen

(57) ABSTRACT

A speedometer gauge mounted on the rear of a vehicle or trailer that continuously and accurately displays a vehicle's speed in real time by utilizing a pattern of lights that illuminate sequentially in such a fashion as to exhibit to the traffic following, the speed of the vehicle, rate of deceleration or acceleration, and to indicate that the vehicle is stopped, in a panic stop, parked, standing, "riding the brake" or "riding the turn indicator" mode. A video game comprising the use of a speedlight.

4 Claims, 38 Drawing Sheets

FIGURE 5

REAR MOUNTED SPEEDOMETER WITH PANIC DECELERATION AND STOPPED VEHICLE WARNING DEVICE

This application claims priority from U.S. Provisional patent application Ser. No. 61/192,407, filed Sep. 18, 2008.

BACKGROUND OF THE INVENTION

The invention disclosed herein relates to a speedometer (speed gauge) mounted on the rear of a vehicle that utilizes a pattern of lights to accurately display to the traffic following, the speed, and change in speed, of the lead vehicle demonstrating both rate of deceleration and rate of acceleration. Furthermore it incorporates a signaling device for panic stops and indicates when a vehicle is at a complete stop. It also warns traffic when a vehicle's air bags or rollover sensors have been activated.

Present day brake light systems tell only when the brake pedal is depressed. The traffic following has no other information. The lead vehicle could be decelerating gradually, stopped, in a panic stop, "riding the brake" or even parked. It could even be accelerating. This has been recognized in past inventions but only with regard to severe deceleration. Numerous inventions address deceleration warning systems, however, all of them have drawbacks and none of them use an accurate speedometer to solve the problem.

Prior systems involve elaborate switch designs and pendulums to set off a deceleration warning signal. Some will only signal one to four levels of deceleration. Others incorporate flashing lights and/or a strobe that will annoy and distract the following traffic. Some don't work at all at low speeds. One even sounds an alarm. Others are extremely complex to learn or "read". None of them accurately demonstrate numerous levels of deceleration with a visual minimum and maximum to relate to. Furthermore they are generally limited to measuring only deceleration.

An accurate rear mounted speedometer with an easy to read display will offer more information at a glance, be less costly to incorporate as an aftermarket add-on or for original equipment manufacturers and be extremely beneficial at reducing collisions and saving lives.

This is accomplished through a simple easy to "read" light pattern that visually distinguishes the difference between parked, stopped, standing, deceleration, acceleration, panic stop, riding the brake, riding the turn indicator or a vehicle involved in an accident. The invention disclosed herein is intended to be incorporated as an aftermarket add-on and/or for original equipment manufacturers.

THE INVENTION

Thus, what is disclosed and claimed herein is a speedometer warning system comprising two or more types of lights, wherein each type of light is distinguishable from all other types of lights in the system. The system is electrically wired such that each light reacts off or on based on a predetermined sequence of events.

The system is controlled by the electrical values relative to the speed of the vehicle that are available from a controller selected from the group consisting of the driveshaft sensor of the vehicle, the speedometer electrical system, and, other electrical components of the vehicle. The speedometer system is typically mounted on the backend of a vehicle or trailer.

In a second embodiment, there is a speedlight comprised of a predetermined number of a series of light emitting diode lights that is in an on mode whenever the ignition switch is activated in a vehicle containing such lights. The lights have the capability of being off, illuminated at low intensity, or being illuminated at high intensity, upon the application of the brakes of the vehicle.

The number of lights of the system that are illuminated at one time being dependent on the speed of the vehicle wherein a lower speed means more lights illuminated and a higher speed means less lights illuminated.

When the vehicle is at a complete stop, all of the lights are illuminated and wherein when the vehicle is moving, fewer lights are illuminated, all such illumination being predetermined based on relative speed of the vehicle.

In yet another embodiment, there is disclosed a speedlight as claimed set forth just Supra, wherein, in addition, there is a plurality of marker lights. The marker lights are located along the light emitting diode lights at predetermined locations to indicate speed of the vehicle. The marker lights are configured differently than the light emitting diode lights to differentiate them from the light emitting diode lights.

In still another embodiment, there is a speedlight as set forth just Supra, wherein, in addition, there is single light, larger than the light emitting diode lights that is located in the center of the line of light emitting diode lights.

BRIEF DESCRIPTION OF THE DRAWINGS

FIG. 5 is an illustration that represents a marker light.

FIG. 37 is an illustration that represents driving constant speed with turn indicator on.

FIG. 38 is an illustration that represents driving and accelerating with turn indicator on.

DETAILED DESCRIPTION OF THE INVENTION

For purposes of discussion herein, the speedlight will be described as a horizontal series of LED lights on the back of a vehicle/trailer (like a third brake light) that illuminates in a fashion that informs the traffic following as to the speed of the lead vehicle. The speedlight is lit/on whenever the ignition switch is in the "on" position. It illuminates at low intensity (running light intensity) so the following traffic will always see the speed of the lead vehicle. Upon braking it will illuminate at high intensity (brake light intensity).

The number of needed lights to illuminate is relative to the speed of the vehicle. If the vehicle is at a complete stop the entire series of lights is illuminated. If the vehicle is going very fast only a few of the LEDs on each end (far left and far right) of the Speedlight will illuminate. As the vehicle speed decreases during braking or coasting more lights will sequentially illuminate from both ends towards the middle making each individual light longer and the distance between them less. The speed with which the two lights "grow together" informs the following traffic of the rate of deceleration of the lead vehicle.

Figure 1:
FIG. 1 is an illustration of a single light emitting diode light.
Figure 2:
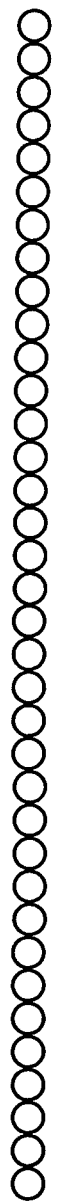
FIG. 2 is an illustration representing a horizontal strip of light emitting diode lights.

When the vehicle comes to a complete stop the entire light strip will illuminate connecting the two lights into one solid line informing the following traffic that the vehicle is stopped. FIG. 1 illustrates a single LED light which is a small round circle. FIG. 2 represents a horizontal strip of such LED lights)

Figure 3:
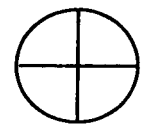
FIG. 3 is an illustration of a panic light.
Figure 4:
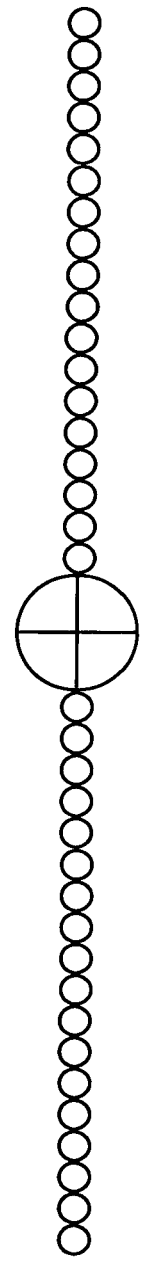
FIG. 4 is an illustration representing a panic light in the middle of a strip of light emitting diode lights.

In one preferred embodiment there is a light or section of lights in the center of the Speedlight called a Panic light. FIG. 3 illustrates a panic light. FIG. 4 represents a panic light in the middle of a strip of LED's.

To make a panic light more visible it can be a different color, for example, orange and larger than the lights in the strip of LEDs (hereinafter also referred to as a speedlight strip).

The panic light will illuminate at low intensity (running light intensity) at all times that the Speedlight is activated (the ignition switch is in the "ON" position). During a "panic stop" (very hard braking/deceleration) the panic light will illuminate at high intensity (brake light intensity). It will also illuminate at high intensity when the vehicle is completely stopped. The threshold for panic deceleration can be set at 15 mph per second, for example. This is faster deceleration than what occurs in most normal driving conditions and fast enough that the following traffic should be warned and prepared to respond.

When the vehicle is at a complete stop the panic light is illuminated at high intensity, in addition to the entire Speedlight strip, as further visual warning that the vehicle is not moving. This is beneficial when approaching a stopped vehicle quickly as can happen around a curve or under other circumstances where there is little time to react.

Incorporating the panic light in the assembly not only makes panic stops more readily visible but also gives the following traffic the ability to visualize the entire length of each side of the Speedlight strip. It is critical that the following traffic visualize the entire length of the speedlight strip at all times so they can accurately determine the speed of the lead vehicle. The panic light allows them to see the one end (the low speed end) of the Speedlight strip. The other end (the high speed end) will have a light or section of lights illuminated all the time that the Speedlight is on (Ignition switch is in the "on" position).

In another embodiment of this invention, the panic light can also be set to illuminate if the anti-lock brake sensors are activated for skidding on ice or wet pavement. There is some concern that this may reduce effectiveness of the panic light due to false alarms. This is especially true in the northern climates where snow and ice cause the anti-lock brakes to activate almost every time you apply the brakes to stop. However, those skilled in the art may determine that there are other times where the panic light can be utilized in an appropriate manner without diminishing its effectiveness.

In the another preferred embodiment the speedlight strip, can be, for example, composed of eighteen lights on either side of the panic light. FIG. 4 illustrates the panic light in the middle of a speedlight strip composed of thirty-six LEDs. Each individual light of the speedlight strip represents a 5 mph increment in speed. This allows for a range from zero to ninety miles per hour (mph). The first LEDs nearest the panic light on each side represent 5 mph. The next one out from the panic light represents 10 mph. The next one 15 mph and so on to the lights on the far left and far right ends that represent 90 mph. If the vehicle is traveling faster than 90 mph the outermost lights will be the only LEDs illuminated indicating that the vehicle is traveling 90 or more mph.

Figure 6:
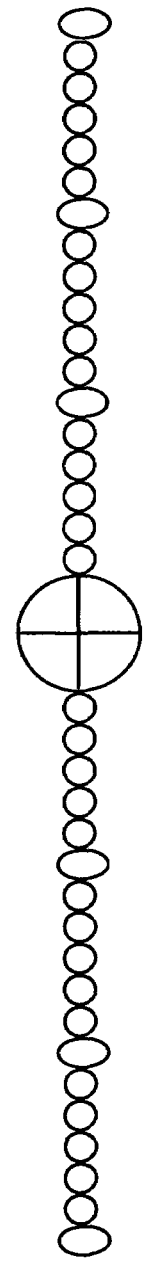
FIG. 6 is an illustration that represents a line of light emitting diode lights containing marker lights and further containing a panic light.

Also, in another preferred embodiment there are marker lights illustrated in FIG. 5. The marker lights are shown at specific points in the speedlight strip so that "reading" the speed of the vehicle is instantaneous. The marker lights are positioned at the 30 mph, 60 mph and 90+ mph positions and will replace the normal red lights that occur at those positional increments in the Speedlight strip. FIG. 6 represents an entire speedlight including panic light and speedlight strip with marker lights incorporated.

The marker lights can also be a different color, for example, orange, and a different shape and/or a larger size than the rest of the lights in the speedlight strip but not as large as the panic light. The different shape and/or larger size not only make them visually discernable to those with normal vision but also to those who are color blind. The marker lights operate the same as any other light in the speedlight strip. The only way they differ is in their color and/or shape. By incorporating marker lights an accurate estimate of the speed of all the lead vehicles can be made at a glance. Knowing that one vehicle is driving much faster or much slower than the vehicles around them alerts the following traffic of the potential danger of sudden lane changes or turns or possibly a collision occurring in front of them.

The paragraphs Supra, outline the components of the speedlight which can be viewed in FIG. 6. For the purposes of terminology clarification the word "speedlight" as used in this invention refers to all of the components in FIG. 6. It does not include the vehicle taillights. The word "speedlight" includes the panic light, marker lights and any red LED lights of the speedlight strip. The words "speedlight strip" refers to any red lights in the strip on both sides of the panic light including the marker lights. It doesn't include the panic light.

The words "panic light" refer to the center section/light of the speedlight that is larger and preferably colored. The words "speedlight system" refer to the entire embodiment and how it works in conjunction with the vehicle's existing lighting system.

To clearly understand the figures used to illustrate this invention it is necessary to establish a "key" as a reference source for the component parts of the speedlight and taillights in the preferred embodiments as described in this invention.

Figure 7:
FIG. 7 is an illustration that represents a taillight.
Figure 25:
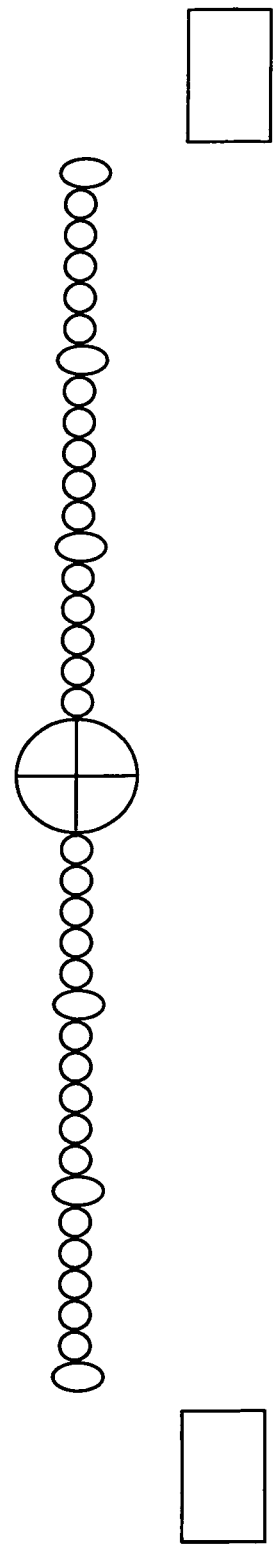
FIG. 25 is an illustration that represents a parked vehicle (ignition off) wherein the speedlight strip is off the panic light is off and the taillights are off and the brakes are off.

A small circle (FIG. 1) is used to indicate an individual LED light whether shown individually or within the speedlight strip. A slightly larger vertically elongated oval as illustrated in FIG. 5 represent a marker light either individually or within the speedlight strip. A much larger circle with a cross in it as shown in FIG. 3 is used to indicate the panic light individually or within the speedlight. A rectangle (FIG. 7) is used to indicate a taillight either individually or within the Figures of the speedlight system. Note that the taillights are not part of the speedlight in this invention, however, they are part of the speedlight system and are included in many of the Figures herein. FIG. 25 illustrates the speedlight system with taillights to the far left and far right.

To illustrate illumination of any light in the Figures herein, a vertical line is used. A line coming off of the bottom of any light indicates that the light is illuminated at low intensity such as the running light intensity of a taillight with the car lights in the "on" position. A line off of the top and bottom of a light indicates that the light is on high intensity such as the intensity of a taillight with the brakes applied. A light that has no line coming vertically off of the top or bottom is illustrated as not being illuminated at all.

Figure 8:
FIG. 8 is an illustration that represents three rows of lights with four lights in each row.
Figure 8:
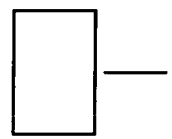
Figure 8:
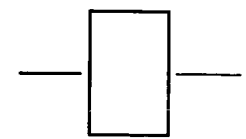
Figure 8:
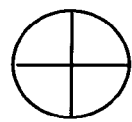
Figure 8:
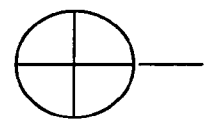
Figure 8:
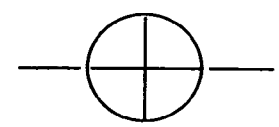
Figure 8:
Figure 8:
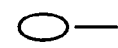
Figure 8:
Figure 8:
Figure 8:
Figure 8:
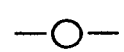

FIG. 8 illustrates three rows of lights with four lights in each row. From left to right each row illustrates an individual LED, a marker light, a panic light and a taillight as previously described. In the top row none of the lights are illuminated as is illustrated by no vertical lines coming off of the top or bottom of the lights. In the middle row all of the lights are illuminated on low intensity as is illustrated by a vertical line coming off of the bottom of each of the lights. In the bottom row all of the lights are illuminated on high intensity as is illustrated by a vertical line coming off of the bottom and top of each of the lights.

Figure 9:
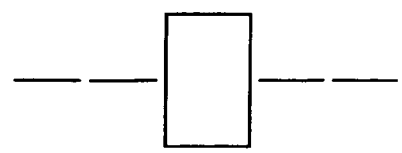
FIG. 9 is an illustration that represents the same four lights as observed in FIG. 8 with all four lights flashing on high intensity.
Figure 9:
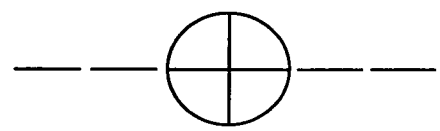
Figure 9:
Figure 9:
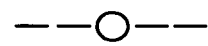

To illustrate that a light is flashing the lines coming off of the light are shown as dash marks instead of solid lines. FIG. 9 illustrates examples of the same four lights in FIG. 8 with all four lights flashing on high intensity.

To illustrate that lights are sequentially illuminating with deceleration or de-illuminating (turning off) with acceleration, horizontal arrows are positioned to come off the tip of the vertical illumination lines. To illustrate deceleration, the arrows are pointed toward the panic light illustrating that the lights are sequentially illuminating toward the panic light as the speed of the vehicle decreases. To illustrate acceleration, the arrows are pointed away from the panic light (toward the left and right ends of the speedlight strip) illustrating that the lights are sequentially de-illuminating outward as the speed of the vehicle increases.

Figure 10:
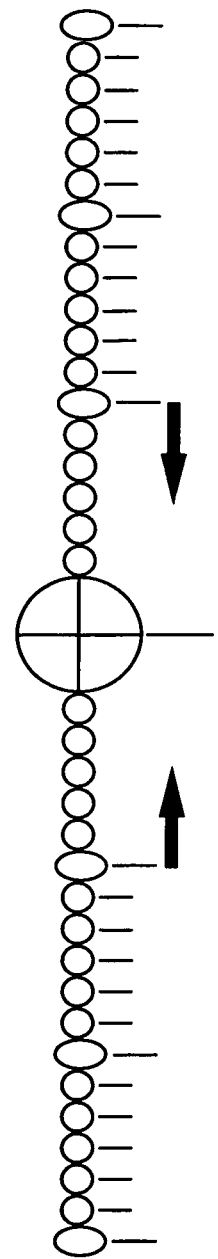
FIG. 10 is an illustration that represents decelerating with the lights on low intensity (no braking/coasting).

FIG. 10 illustrates decelerating with the lights on low intensity (no braking/coasting). The arrows are pointed toward the panic light illustrating the direction of lights sequentially illuminating on both sides of the speedlight strip.

Figure 11:
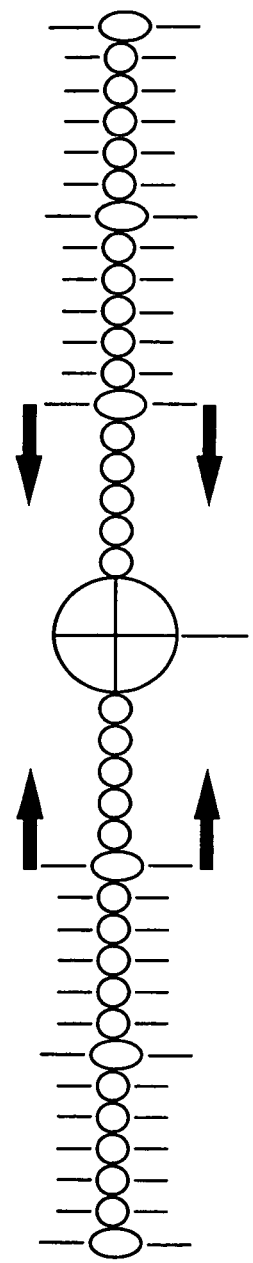
FIG. 11 is an illustration that represents a deceleration with the lights on high Intensity (brakes applied).

FIG. 11 illustrates decelerating with the lights on high intensity (brakes on). Again the arrows are pointed toward the panic light illustrating the direction of lights sequentially illuminating on both sides of the speedlight strip. The difference is that there are arrows for the low intensity illumination lines below the speedlight strip and arrows for the high intensity illumination lines above the speedlight strip because the brakes are on.

For acceleration, the arrows are pointed away from the panic light to illustrate that the lights are sequentially de-illuminating (turning off).

Figure 12:
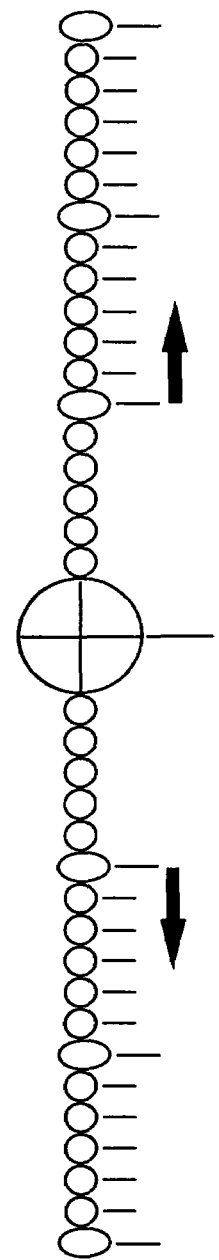
FIG. 12 is an illustration that represents acceleration with no braking.

FIG. 12 illustrates acceleration with no braking. The arrows are coming off the low intensity illumination lines below the Speedlight strip and are pointed outward/away from the panic light.

Figure 13:
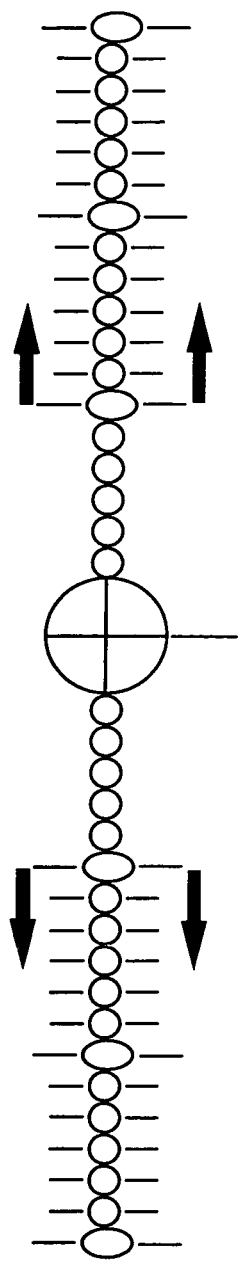
FIG. 13 is an illustration that represents acceleration with braking as will occur when "riding the brake".

FIG. 13 illustrates acceleration with braking as occurs when "riding the brake". The arrows are coming off both the low intensity illumination lines below the speedlight strip and off the high intensity lines above the speedlight strip and all the arrows are pointed outward/away from the panic light.

Figure 14:
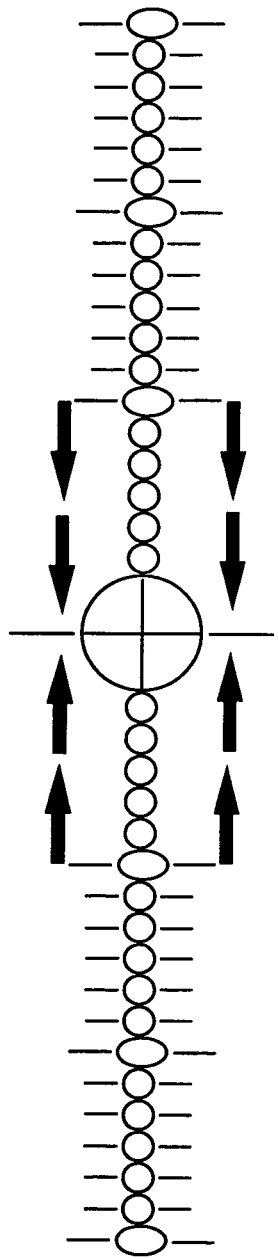
FIG. 14 is an illustration that represents two arrows tip to tail showing panic Deceleration with lights on high intensity.

In the event of a panic stop the arrows appear the same as deceleration with lights on high intensity (FIG. 11) except there are two arrows "tip to tail" wherever one arrow was employed for normal deceleration (FIG. 14). This illustrates that the lights are illuminating at a very rapid rate of speed that meets or exceeds the 15 mph per second minimum to be a "panic stop". This automatically illuminates the panic light on high intensity.

As mentioned Supra, a preferred embodiment of the speedlight strip is 18 LED lights (including marker lights) on either side of the panic light (FIG. 6). Each light represents a 5 mph increment in speed. However the data from the vehicle "feeding" the speedlight is in one mph increments. Thus, the 30 mph light in the speedlight strip is illuminated at 30 mph or less and will de-illuminate at 31 mph or more. The 25 mph light illuminates at 25 mph or less and de-illuminates at 26 mph or more. Therefore when the mph light is illuminated and the 25 mph light is de-illuminated it means that the vehicle is traveling between 26 and 30 mph. This is the five mph range of the 30 mph light. At 25 mph the 25 mph light illuminates indicating that the vehicle is traveling between 21 and 25 mph. This pattern is true throughout the entire range of the speedlight with the exception of the 90 mph light which is illuminated at all times. When it is the only light illuminated it indicates that the vehicle is traveling at 90 mph or more.

Figure 15:
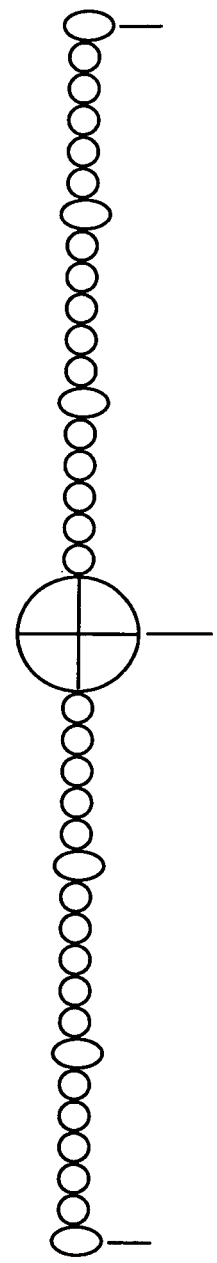
FIG. 15 is an illustration that represents the illumination pattern of the light emitting diode lights illustrating a vehicle traveling 90 miles per hour or more with lights on low intensity.
Figure 16:
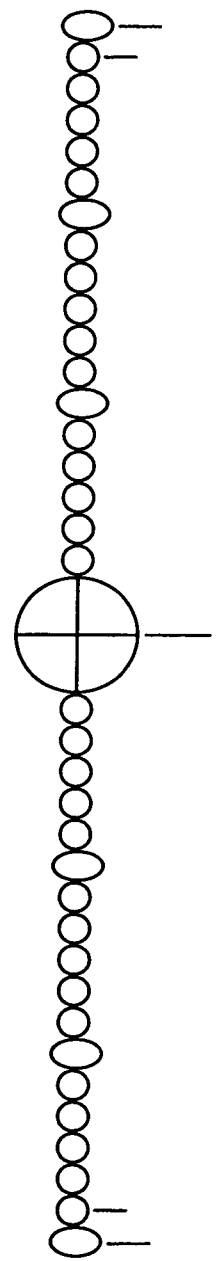
FIG. 16 is an illustration that represents a showing two lights illuminated on each end of the strip of light emitting diode lights illustrating 85 miles per hour.
Figure 17:
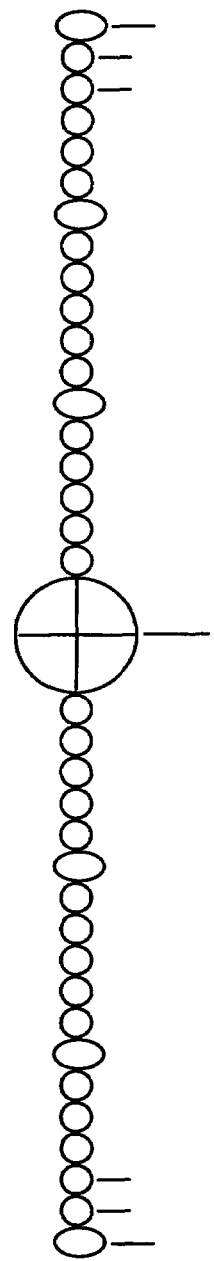
FIG. 17 is an illustration that represents illumination at 80 miles per hour.
Figure 18:
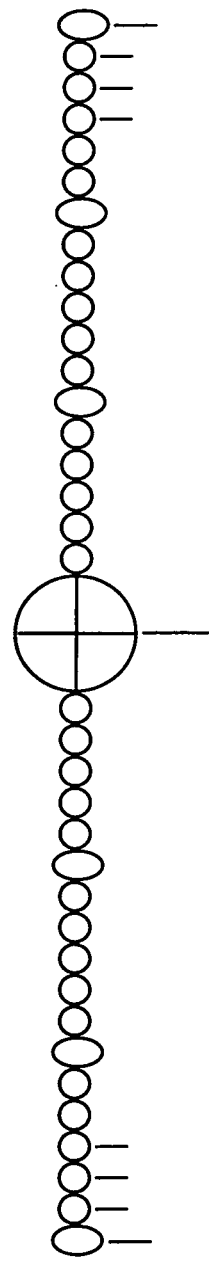
FIG. 18 is an illustration that represents illumination at 75 miles per hour.
Figure 19:
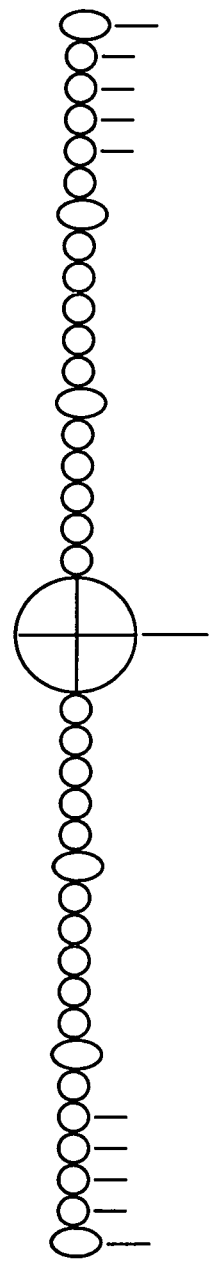
FIG. 19 is an illustration that represents 70 miles per hours.
Figure 20:
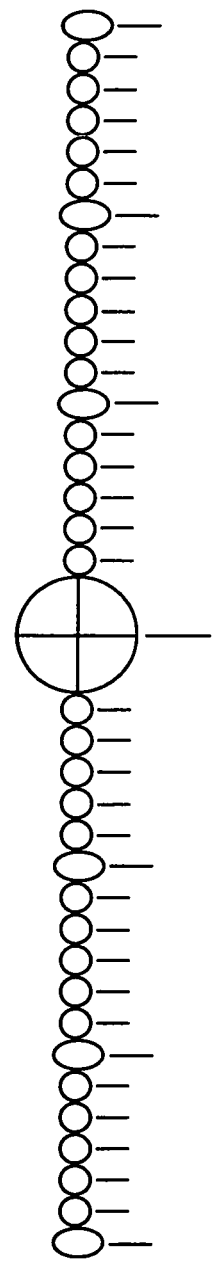
FIG. 20 is an illustration that represents 5 miles per hour.

The illumination pattern of the eighteen LED lights of the speedlight strip allows for a range from zero to 90 mph in five mph increments. At speeds of 90 mph or more only the ends (far left and far right) are illuminated (see FIG. 15). At 85 mph the next light in (towards the center/panic light) from each end will illuminate so there are two lights illuminated on each end of the speedlight strip (FIG. 16). At 80 mph three lights on each end (FIG. 17). At 75 mph four lights on each end (FIG. 18). At 70 mph five lights on each end (FIG. 19) and so on to 5 mph where all eighteen lights on each side of the speedlight strip is illuminated (FIG. 20).

Figure 21:
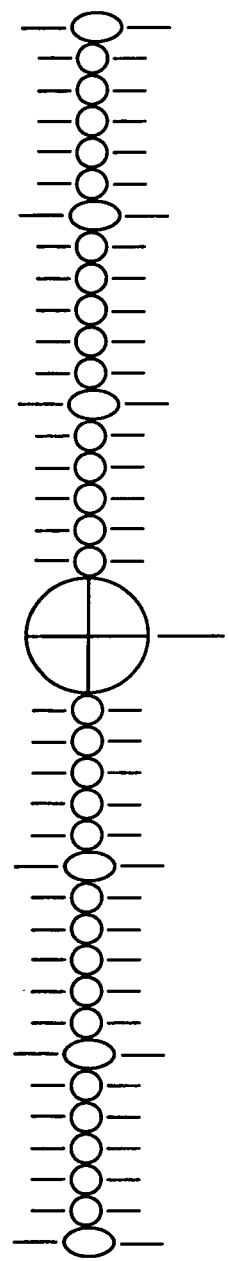
FIG. 21 is an illustration that represents 5 miles per hour with the brakes applied and light on high intensity.

These lights all illuminate at low intensity unless the brake is applied at which time they illuminate at high intensity (FIG. 21). Therefore at 5 mph the entire speedlight strip and panic light are illuminated at low intensity. If the brakes are applied at this point the Speedlight strip illuminates on high intensity but the panic light remains at low intensity until the vehicle comes to a complete stop. When the vehicle comes to a complete stop the entire speedlight strip and the panic light illuminates on high intensity indicating that the vehicle is completely stopped (see FIG. 22).

There are only two circumstances in which the panic light illuminates on high intensity. One is during a panic stop and the other is when the vehicle is at a complete stop.

Figure 22:
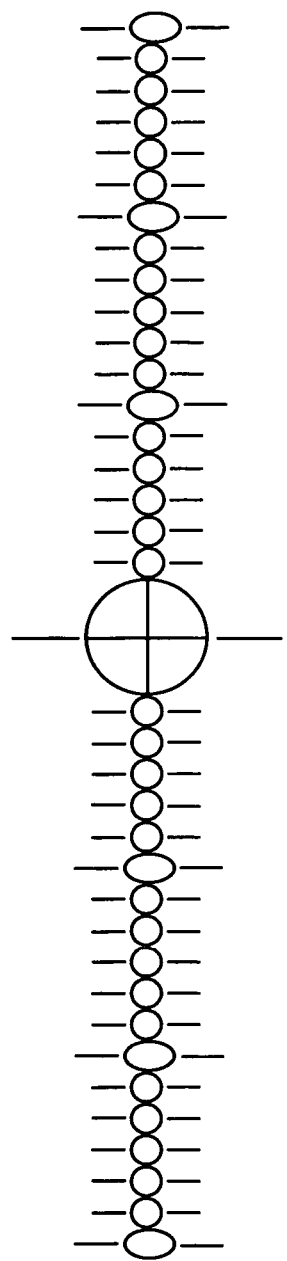
FIG. 22 is an illustration that represents illumination of a stopped vehicle with brakes applied.

A completely stopped vehicle is visually different from what is viewed during a panic stop (deceleration rate of 15 mph per second or greater). The entire speedlight strip and panic light illuminate on high intensity when a vehicle is completely stopped (FIG. 22). During a panic stop the panic light is illuminated on high intensity and the speedlight strip is illuminated on high intensity (because the brakes are applied) however the entire speedlight strip is not illuminated. Instead it is rapidly and sequentially illuminating lights towards the center of the speedlight accurately indicating the speed of the vehicle and the rate of deceleration (FIG. 14). The difference between a panic stop and a completely stopped vehicle is obvious to the following traffic.

While the vehicle is moving the panic light will only illuminate at high intensity during a time of rapid deceleration (panic stop). This can change from second to second during deceleration. The driver may start off decelerating slowly and suddenly go into a panic stop for a second or two and then back to slower deceleration again once the danger has passed. The panic light will only be in high intensity mode for the brief time that the rate of deceleration exceeded 15 mph per second.

Figure 23:
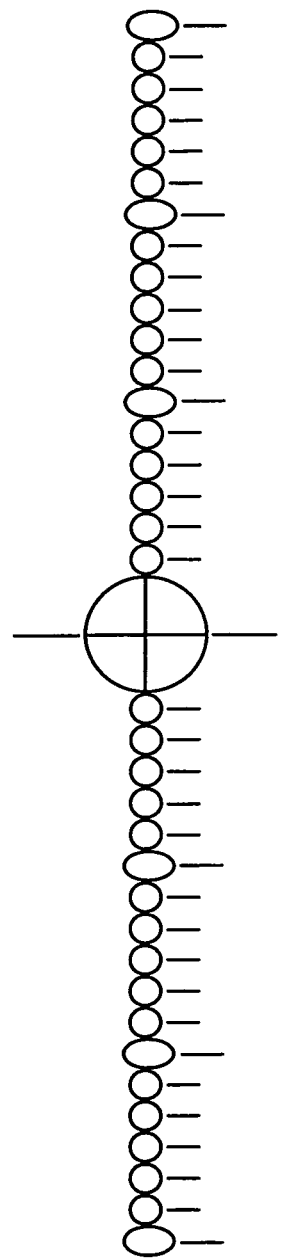
FIG. 23 is an illustration that represents a standing vehicle which is stopped in park with no brakes applied.

The speedlight allows us to distinguish between a "parked" vehicle, a "standing" vehicle and a "stopped" vehicle. A "parked" vehicle, that is, gear selector in "park", ignition off and brakes not depressed, will have nothing illuminated (FIG. 6). A "standing" vehicle, gear selector in "park", ignition on and brakes not depressed, will make the entire speedlight strip illuminated at low intensity and the panic light illuminated at high intensity (FIG. 23). When the driver applies the brakes to shift into drive the entire speedlight strip, including the panic light, will illuminate on high intensity warning other traffic of his intentions and that the vehicle is now in the "stopped" mode and ready to move (FIG. 22).

Figure 24:
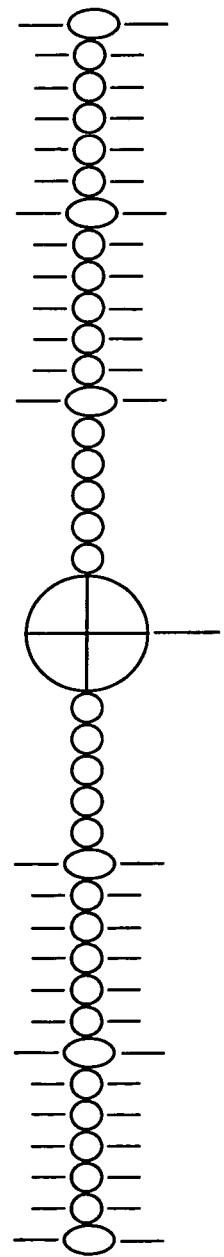
FIG. 24 is an illustration that represents the speedlight while riding the brake at 30 miles per hour.

"Riding the brake" is easily discernable with the speedlight. If a driver is "riding the brake" the speedlight strip will illuminate on high intensity (brakes applied) and indicate the speed of the vehicle. At a constant speed it is a static/unchanging display on high intensity. FIG. 24 illustrates the speedlight while "riding the brake" at 30 mph.

This indicates that the vehicle is moving and braking but not changing speed. The number of lights illuminated will only change if the vehicle speed is altered. If the driver starts to decelerate the lights will sequentially illuminate (on high intensity), indicating so. FIG. 11 illustrates the speedlight at 30 mph while braking and decelerating. If the driver is accelerating, the number of lights (still on high intensity) will sequentially turn off indicating that the driver is accelerating and "riding the brake". FIG. 13 illustrates the speedlight at 30 mph while "riding the brake" and accelerating.

Present day brake lighting does not inform the following traffic as to when and if a vehicle is decelerating or accelerating when they are "riding the brake". Rather one is forced to pay particular attention to visually judge the speed of the "brake rider" to avoid a collision with them. This distracts attention from all other traffic. The speedlight takes the guess work out of knowing what the "brake rider" is doing.

Figure 37:
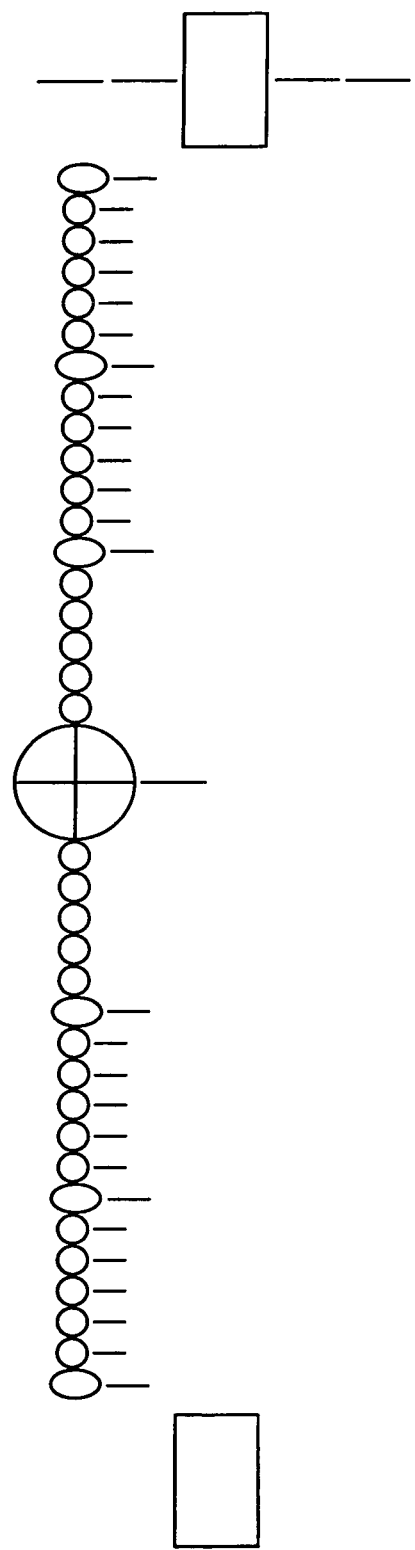
Figure 38:
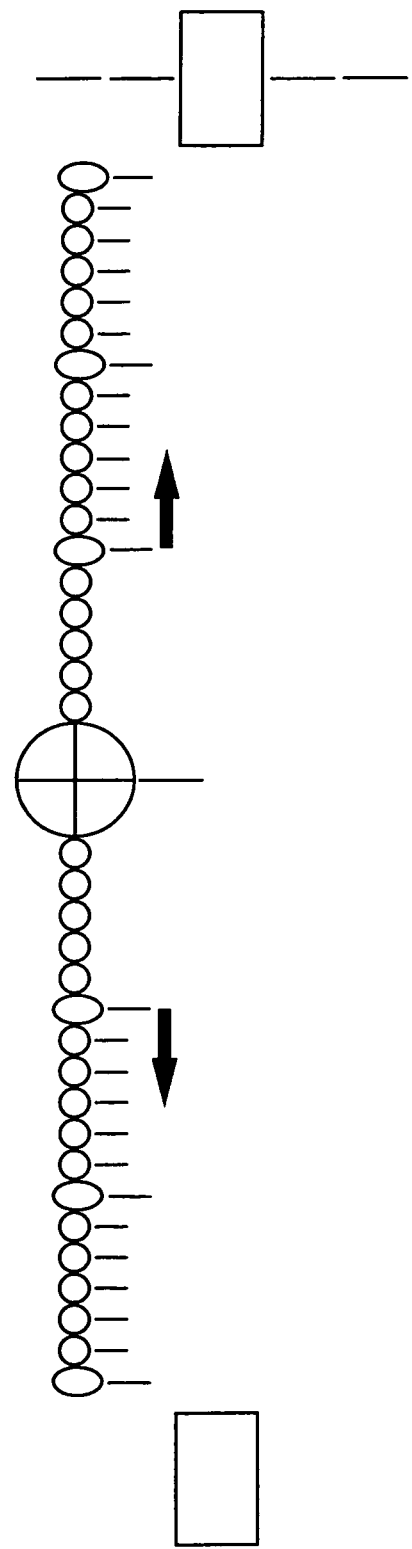

The speedlight system, including taillights, helps to know when a vehicle "riding the turn indicator" is likely to turn. Vehicles may pass several driveways or go several blocks with the turn indicator on before making a turn. Other times it is left on by mistake. The following traffic has to pay attention to gauge how fast the lead vehicle is going. Are they going at a constant speed? Are they accelerating? Are they decelerating or going slow enough to negotiate a turn? The following traffic's attention is distracted from all other aspects of driving as they monitor the vehicle in front of them. With the speedlight we can easily view the speed of the lead vehicle and "see" when they accelerate and "see" when they decelerate. We can also "see" when they are going slow enough to negotiate a turn without giving them undivided attention. One can anticipate an intention to turn by seeing when they are going slow enough or decelerating fast enough to do so. FIG. 37 illustrates the Speedlight System (including taillights) of a vehicle "riding the turn indicator" at a constant speed of thirty mph. FIG. 38 illustrates the speedlight system (including taillights) of a vehicle at thirty mph "riding the turn indicator" and accelerating.

Figure 29:
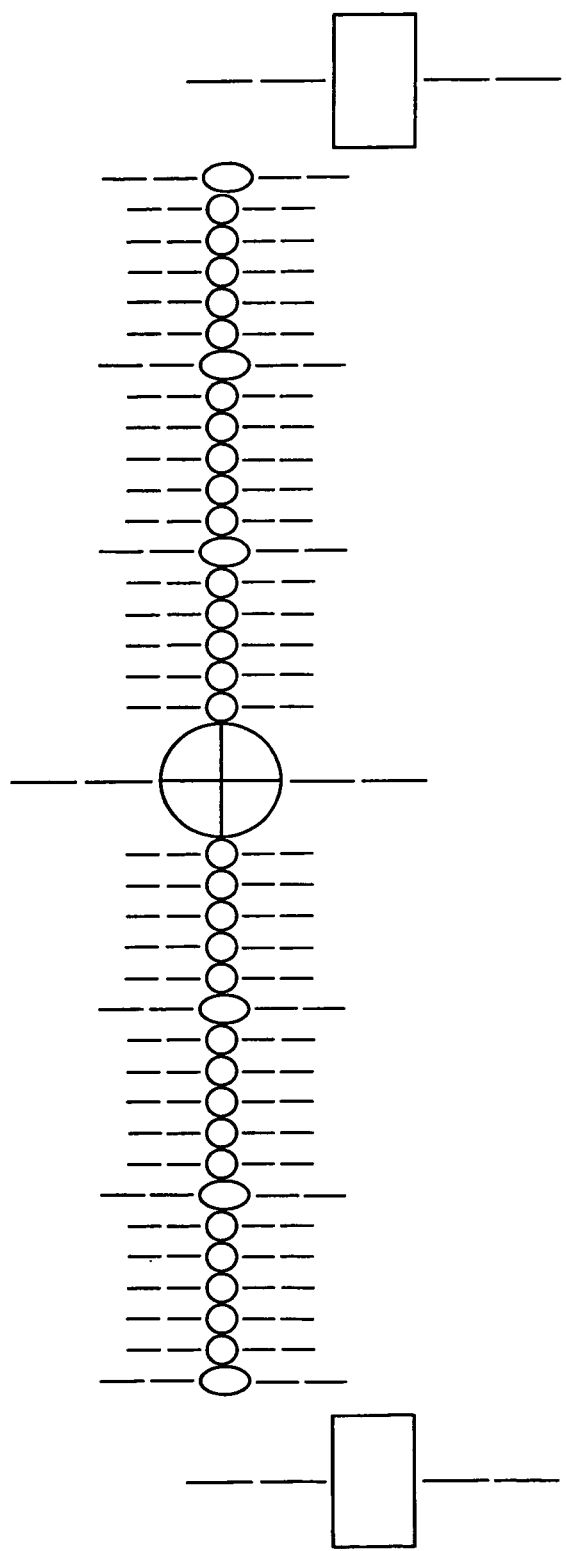
FIG. 29 is an illustration that represents the speedlight system including taillights in the event of an accident with all lights flashing.

Additionally in a preferred embodiment, the entire speedlight including the panic light and vehicle hazard lights will illuminate on high intensity and flash with the deployment of any air bags on the vehicle or activation of "rollover sensors". In automobile accidents the driver is not always capable to take action to warn the following traffic that the vehicle has been in an accident. This will happen automatically (even if the ignition switch is off) to prevent multiple vehicle accidents. FIG. 29 illustrates the speedlight system (including taillights) in the event of an accident.

In another preferred embodiment the speedlight is fully functional in reverse gear. With the vehicle in reverse gear the speedlight still shows the speed of the vehicle, rate of acceleration and deceleration, brake activation, stopped mode (panic light on), panic stop mode, even "riding the brake". The only difference is that the reverse lights are illuminated indicating direction of travel.

All visual examples of the preferred embodiment in this invention are illustrated with the headlights/parking lights "off". If the headlights/parking lights were "on" the taillights are on low intensity wherever they are indicated as "off" in any of the Figures.

The following are the modes with the vehicle not moving

Figure 26:
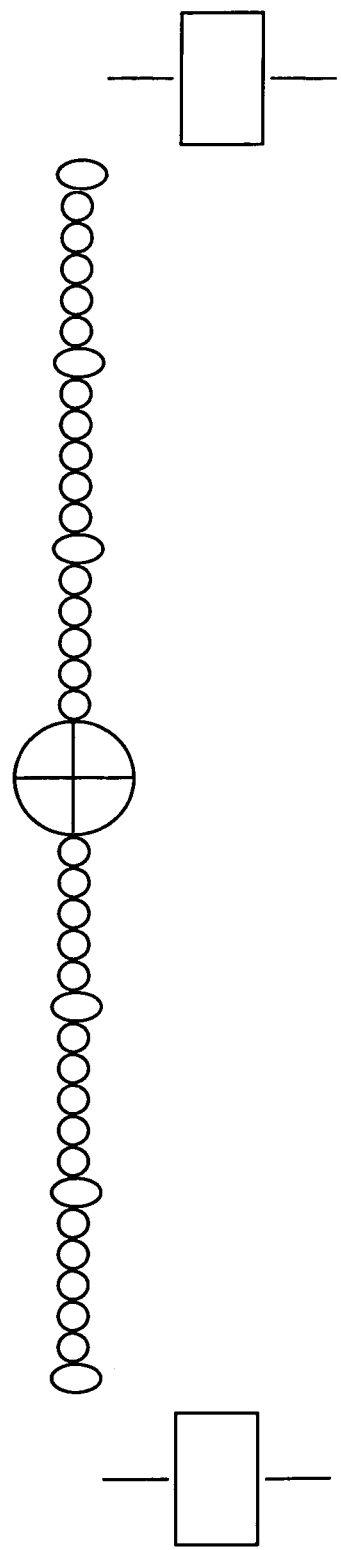
FIG. 26 is an illustration that represents a parked vehicle with the brakes applied, the speedlight strip off, the panic light off, and the taillights on high intensity.
Figure 27:
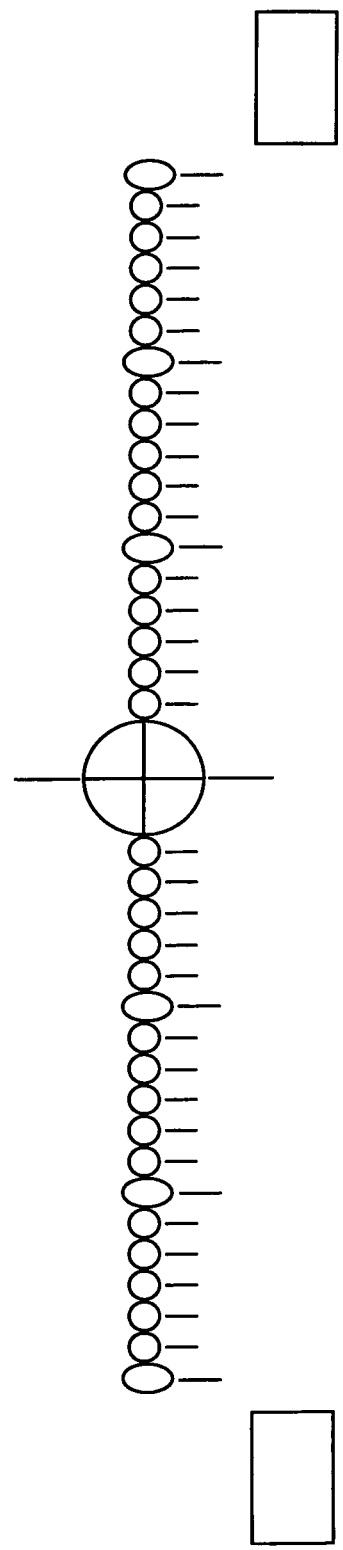
FIG. 27 is an illustration that represents a standing vehicle wherein the speedlight strip is on low intensity, the panic light is on high intensity, and the taillights are off (brakes not applied).
Figure 28:
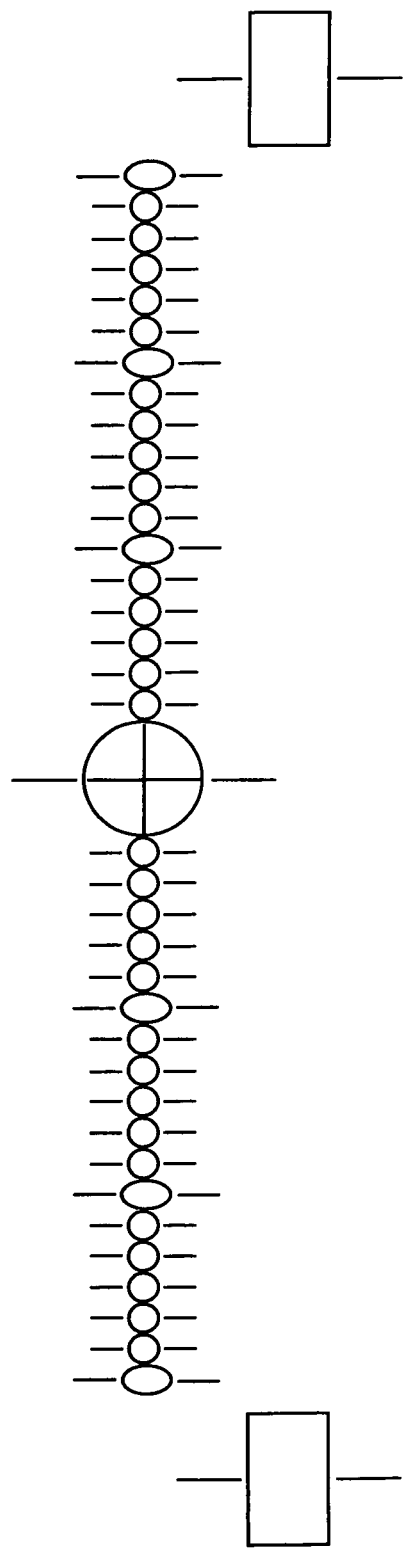
FIG. 28 is an illustration that represents a stopped vehicle (the same as shifting in and out of park), wherein the speedlight strip is on high intensity, the panic light is on high intensity, the taillights are on high intensity.

FIG. 25 illustrates the vehicle parked with the speedlight strip off, the panic light off and the taillights off. FIG. 26 illustrates parked with brakes applied, speedlight strip off, panic light off and taillights on high intensity. FIG. 27 illustrates standing, the speedlight strip on low intensity, the panic light on high intensity, and the taillights off. FIG. 28 illustrates a stopped vehicle (the same as shifting in and out of park) with the speedlight strip on high intensity, the panic light on high intensity and the taillights on high intensity. FIG. 29 illustrates a vehicle involved in an accident with the speedlight strip on high intensity and flashing. The entire speedlight is illuminated and flashing, the panic light is on high intensity and flashing and the taillights are on high and flashing.

Figure 30:
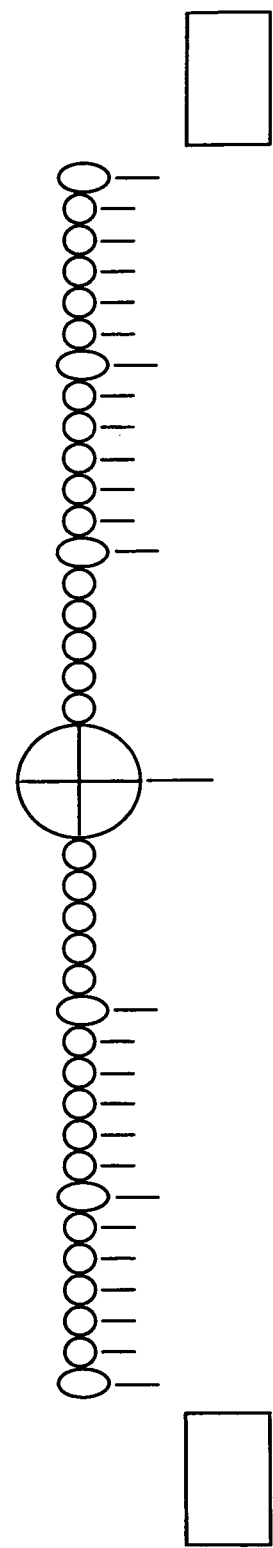
FIG. 30 is an illustration that represents a constant speed with no braking.
Figure 31:
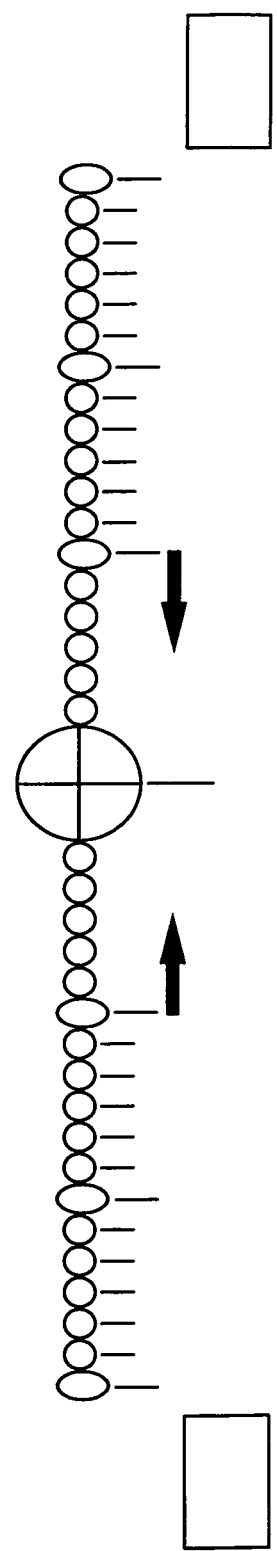
FIG. 31 is an illustration that represents driving and decelerating with no braking, coasting.

The following are modes of the vehicle while moving at 30 miles per hour. FIG. 30 illustrating driving at constant speed with no braking wherein the speedlight strip is on low intensity, the lights are illuminated in from the ends with static display indicating the speed of the vehicle, the panic light is on low intensity and the taillights are off. FIG. 31 illustrates driving and decelerating with no braking while coasting and the speedlight strip is on low intensity, the lights are slowly illuminating sequentially in from the ends relative to the rate of deceleration, the panic light is on low intensity and the taillights are off.

Figure 32:
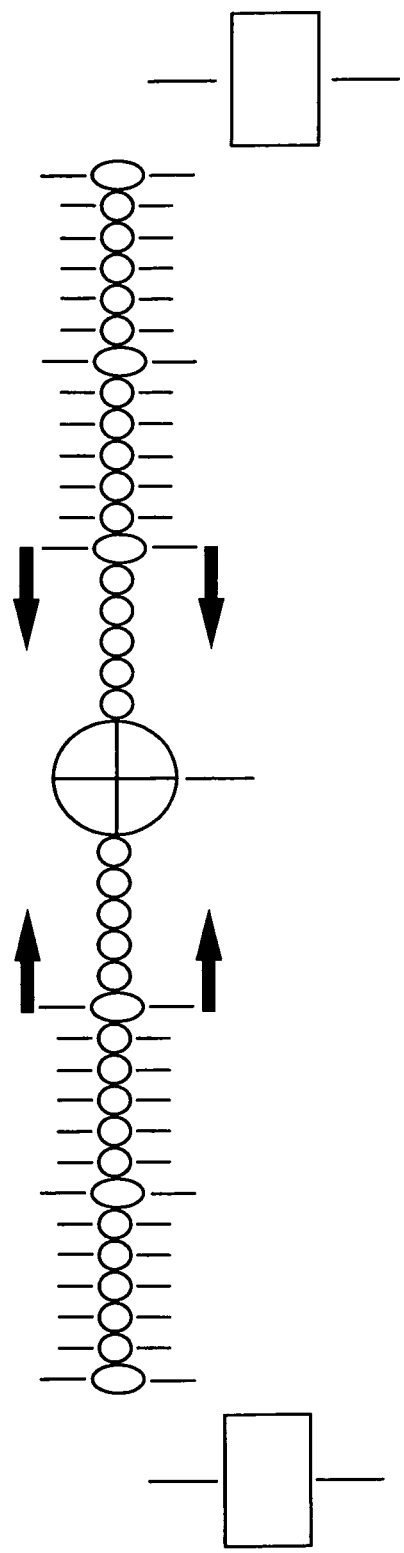
FIG. 32 is an illustration that represents driving and decelerating with braking.
Figure 33:
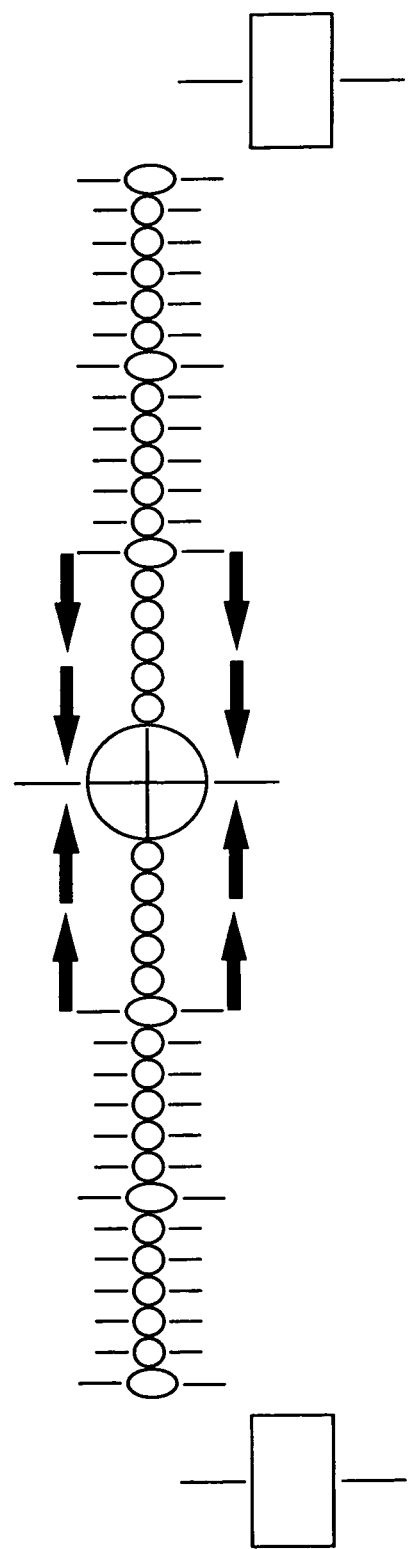
FIG. 33 is an illustration that represents panic stop deceleration.

FIG. 32 illustrates driving and decelerating with braking wherein the speedlight strip is on high intensity, the lights illuminating sequentially, in from the ends relative to rapid rate of deceleration, the panic light is on low intensity and the taillights are on high intensity. FIG. 33 illustrates panic stop/deceleration wherein the speedlight strip is on high intensity, the lights are quickly illuminating sequentially in from ends relative to very rapid rate of deceleration, the panic light is on high intensity and the taillights are on high intensity.

Figure 34:
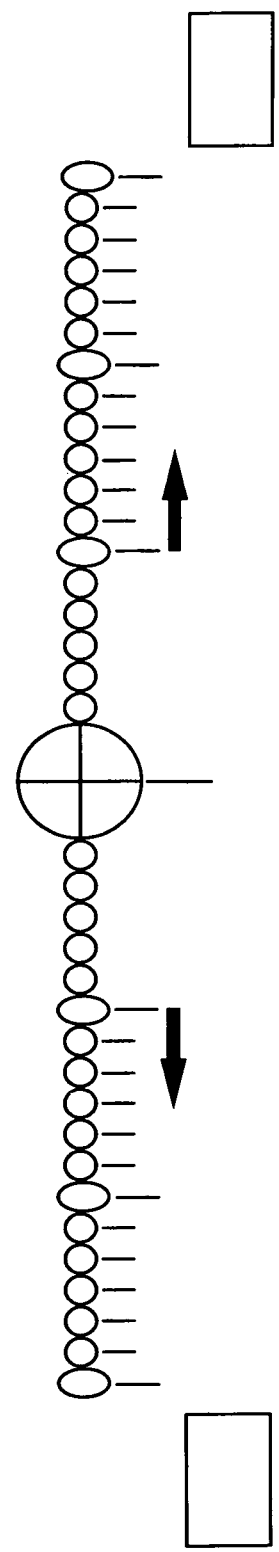
FIG. 34 is an illustration that represents driving and accelerating with no braking.

FIG. 34 illustrates driving and accelerating with no braking wherein the speedlight strip is on low intensity, the lights are turning off sequentially out from the center relative to rate of acceleration, the panic light is on low, and the taillights are [on] off.

Figure 35:
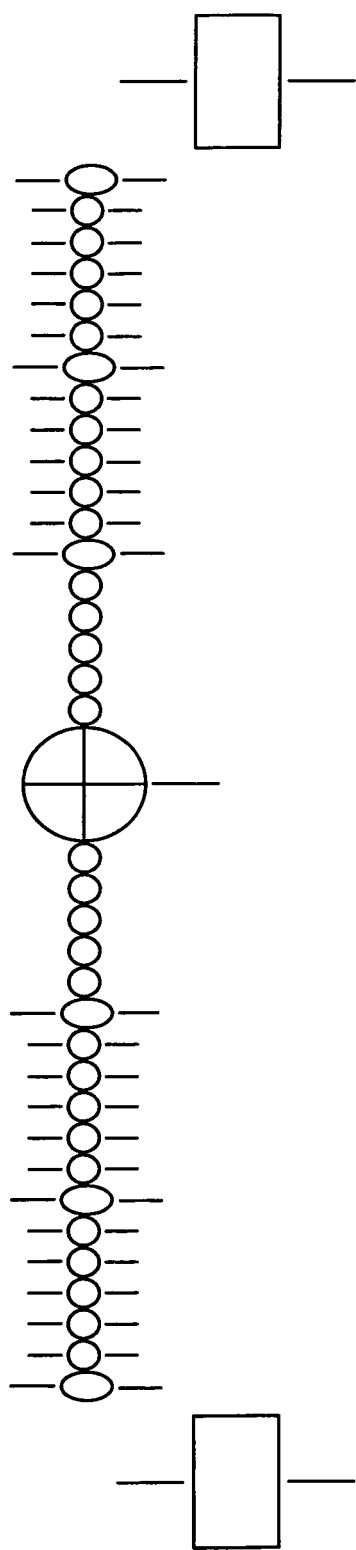
FIG. 35 is an illustration that represents driving constant speed with braking.
Figure 36:
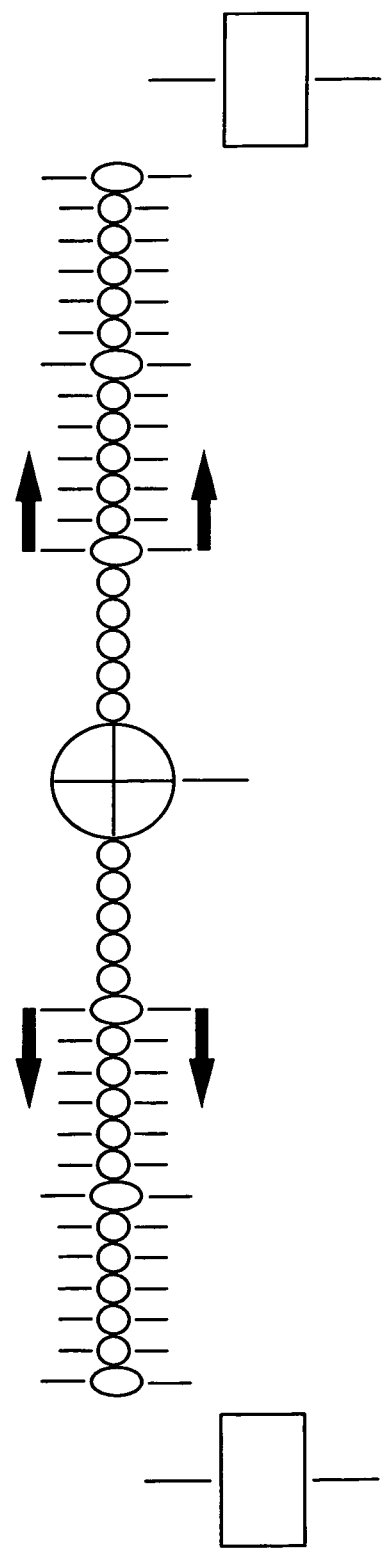
FIG. 36 is an illustration that represents driving and accelerating with braking.

The following are modes of riding the brake at 30 miles per hour. FIG. 35 illustrates driving constant speed with braking wherein the speedlight strip is on high intensity, the lights are illuminated in from the ends with static display indicating the speed of the vehicle, the panic light is on low intensity, and the taillights are on high intensity. FIG. 36 illustrates driving and accelerating with braking wherein the speedlight strip is on high intensity, the lights are turning off sequentially out from the center relative to the rate of acceleration, the panic light is on low intensity and the taillights are on high intensity.

The following are modes of riding the turn indicator at 30 miles per hour.

FIG. 37 illustrates driving constant speed with turn indicator on wherein the speedlight strip is on low intensity, the lights are illuminated in from the ends with static display indicating the speed of the vehicle, the panic light is on low intensity, the taillights are such that one is off and one is on high intensity and flashing, FIG. 38 illustrates driving and accelerating with turn indicator on wherein the speedlight strip is on low, the lights are turning off sequentially out from the center relative to the rate of acceleration, the panic light is on low intensity, the taillights are such that one is off and one is on high intensity and flashing.

Those skilled in the art such as an automotive electrical engineer should have very little difficulty in understanding the speedlight warning system of this invention. The electrical values relative to the speed of the vehicle are available from the driveshaft sensor, the speedometer electrical system or other electrical components of the vehicle. Connecting into these components for wiring the Speedlight system is not difficult.

Certain embodiments in this invention describe the invention in detail, but it is to be understood that the invention is not limited in its application to the details of construction and to the arrangements of the components set forth herein or illustrated in the drawings. The invention is capable of other embodiments and of being practiced and carried out in various ways.

There are numerous patterns or arrangements of lights that will work to exhibit the varying degrees of speed and braking intensity or deceleration. Having two separate lights that "grow together" to form one makes it obvious to the following traffic when a vehicle is at a complete stop. These two lights can be a straight horizontal line, vertical line, "V" formation or whatever. It also can be that the light pattern grows to form a complete circle when stopped.

Employing a panic light not only makes panic stops more readily visible but it also allows for a whole new array of light and taillight arrangements on vehicles with speedlight technology.

Individual taillights can be speedlights. As an example one can have a taillight speedlight that is a vertical strip with the panic light at the top. During a panic stop the speedlight strip illuminates sequentially (fast) and the panic light is on high intensity.

The panic light can also be at the center of a circle of lights that sequentially illuminate to form the circle as the vehicle decelerates. Upon a panic stop the circle of lights sequentially illuminate (fast) and the panic light (in the center of the light) is on high intensity indicating a panic stop.

Turn indicators use the same lights as the speedlight taillights that are sequentially illuminating, however, they are blinking on the taillight that is indicating when a turn is going to occur.

With respect for the above description then, it is to be realized that the optimum dimensional relationships for the parts of the invention, to include variations in size, materials, shape form, function and the manner of operation, assembly and use, are contemplated within the scope of this invention.

What is claimed is:

1. A speedometer warning system comprising two or more types of lights, wherein each type of light is distinguishable from all other types of lights in the system, said system being electrically wired such that each light reacts off or on based on a predetermined sequence of events;
   said system being controlled by electrical values relative to a vehicle speed, that are available from a controller selected from a group consisting of
      i a driveshaft sensor of the vehicle,
      ii a speedometer electrical system, and,
      iii other electrical components of the vehicle;
said speedometer system being mounted on a backend of a vehicle or trailer.

2. A speedlight, said speedlight comprised of a predetermined number of a series of light emitting diode lights that would be in an on mode whenever an ignition switch is activated in a vehicle containing such lights, said lights [having the capability of being] being capable of being off, illuminated at low intensity, or being illuminated at high intensity, upon an application of the brakes of the vehicle;
   the number of lights of the system that are illuminated at one time being dependent on a speed of the vehicle wherein a lower speed means more lights illuminated and a higher speed means less lights illuminated;
   wherein when the vehicle is at a complete stop, all of the lights would be illuminated and wherein when the vehicle is moving, fewer lights would be illuminated, all such illumination being predetermined based on relative speed of the vehicle.

3. A speedlight as claimed in claim 2 wherein, in addition, there is a plurality of marker lights, said marker lights being located along said light emitting diode strip at predetermined locations to indicate speed of the vehicle, said marker lights being configured differently than the light emitting diode lights to differentiate them from the light emitting diode lights.

4. A speedlight as claimed in claim 2, wherein, in addition, there is single light, larger than the light emitting diode lights that is located in a center of said line of light emitting diode lights.

\* \* \* \* \*